US011273943B2

(12) United States Patent
Taguchi et al.

(10) Patent No.: US 11,273,943 B2
(45) Date of Patent: Mar. 15, 2022

(54) BLISTER PACKAGING MACHINE

(71) Applicant: CKD CORPORATION, Aichi (JP)

(72) Inventors: Yukihiro Taguchi, Aichi (JP); Hisanao Wate, Aichi (JP); Shozo Oda, Aichi (JP); Eiji Ota, Aichi (JP)

(73) Assignee: CKD CORPORATION, Aichi (JP)

( * ) Notice: Subject to any disclaimer, the term of this patent is extended or adjusted under 35 U.S.C. 154(b) by 156 days.

(21) Appl. No.: 16/784,817

(22) Filed: Feb. 7, 2020

(65) Prior Publication Data
US 2020/0172279 A1    Jun. 4, 2020

Related U.S. Application Data

(63) Continuation of application No. PCT/JP2018/012127, filed on Mar. 26, 2018.

(30) Foreign Application Priority Data

Aug. 8, 2017 (JP) .............................. JP2017-152986

(51) Int. Cl.
*B65B 57/02* (2006.01)
*B29C 51/10* (2006.01)
(Continued)

(52) U.S. Cl.
CPC .............. *B65B 57/02* (2013.01); *B29C 51/10* (2013.01); *B29C 51/30* (2013.01); *B65B 47/08* (2013.01); *B29L 2007/00* (2013.01); *B65B 9/04* (2013.01)

(58) Field of Classification Search
CPC ..... G01B 11/0691; G01B 11/02; B29C 51/30; B29C 51/26; B29C 51/10; B65B 47/08;
(Continued)

(56) References Cited

U.S. PATENT DOCUMENTS 4,623,254 A * 11/1986 Imose ................ G01B 11/0691
356/632
4,909,018 A * 3/1990 Yamamoto .............. B65B 9/067
53/450

(Continued)

FOREIGN PATENT DOCUMENTS

JP      2004269004 A     9/2004
JP      2005111751 A     4/2005
(Continued)

OTHER PUBLICATIONS

International Search Report issued in corresponding International Application No. PCT/JP2018/012127, dated May 29, 2018, with translation (6 pages).
(Continued)

*Primary Examiner* — Thomas M Wittenschlaeger
(74) *Attorney, Agent, or Firm* — Osha Bergman Watanabe & Burton

(57) ABSTRACT

A blister packaging machine includes: a pocket portion forming unit that forms a pocket portion having a bottom portion and a side portion, in a belt-like container film, and adjusts balance between a thickness of the bottom portion and a thickness of the side portion; an illumination device that is disposed on a downstream side of the pocket portion forming unit, and irradiates the pocket portion with an electromagnetic radiation; an imaging device that is disposed on a side opposite to the illumination device across the container film, and obtains transmitted image data based on the electromagnetic radiation transmitted through the pocket portion; a side portion state detector that detects a state of the thickness of the side portion based on the transmitted image data; and a controller that controls an operation of the pocket portion forming unit.

17 Claims, 12 Drawing Sheets

(51) Int. Cl.
  *B29C 51/30* (2006.01)
  *B65B 47/08* (2006.01)
  *B29L 7/00* (2006.01)
  *B65B 9/04* (2006.01)

(58) Field of Classification Search
  CPC ......... B65B 57/06; B65B 57/02; B65B 57/10; B65B 57/04; B65B 57/00; B65B 9/04; B29L 2007/00
  See application file for complete search history.

(56) References Cited

U.S. PATENT DOCUMENTS

| | | | | |
|---|---|---|---|---|
| 4,937,449 | A * | 6/1990 | Kreuzer | G01B 11/0691 250/339.06 |
| 9,046,349 | B2 * | 6/2015 | Typpo | G01B 11/0691 |
| 9,846,028 | B2 * | 12/2017 | Ohtsuka | G01N 21/8422 |
| 10,689,137 | B2 * | 6/2020 | Wolf | B65B 43/04 |
| 10,737,818 | B2 * | 8/2020 | Lau | B65B 57/12 |
| 10,839,501 | B2 * | 11/2020 | Futase | B29C 66/8491 |
| 10,858,135 | B2 * | 12/2020 | Hattori | B65B 61/025 |
| 2019/0011251 | A1 * | 1/2019 | Moeller | G01B 21/06 |
| 2019/0259143 | A1 * | 8/2019 | Futase | B29C 66/93451 |

FOREIGN PATENT DOCUMENTS

| | | |
|---|---|---|
| JP | 2009276102 A | 11/2009 |
| JP | 2011219114 A | 11/2011 |
| JP | 2012206738 A | 10/2012 |
| JP | 201566862 A | 4/2015 |
| JP | 201575437 A | 4/2015 |
| JP | 201594694 A | 5/2015 |

OTHER PUBLICATIONS

Written Opinion issued in corresponding International Application No. PCT/JP2018/012127, dated May 29, 2018 (3 pages).

International Preliminary Report on Patentability issued in corresponding International Application No. PCT/JP2018/012127, dated Feb. 20, 2020, with translation (11 pages).

* cited by examiner

BLISTER PACKAGING MACHINE

BACKGROUND

Technical Field

The present invention relates to a blister packaging machine configured to manufacture a blister sheet that contains a predetermined content therein.

Description of Related Art

A blister sheet includes a container film that is provided with pocket portions formed to respectively contain contents such as tablets or capsules and a cover film that is mounted to the container film to close openings of the pocket portions.

The blister sheet is manufactured by a blister packaging machine. The blister packaging machine includes a pocket portion forming unit configured to form pocket portions in a belt-like container film; a filling unit configured to fill contents into the pocket portions; a mounting unit configured to mount a belt-like cover film to the container film; and a punching unit configured to punch out a belt-like blister film obtained by mounting the cover film to the container film, so as to obtain the blister sheet.

The pocket portion forming unit may employ a plate-type pressure forming method or a plug forming method. The plate-type pressure forming method sandwiches a heated and softened container film between a first mold having recesses in a shape corresponding to the pocket portions and a second mold having holes for the air supply and supplies the high-pressure air to the holes of the second mold to expand the container film toward the recesses, so as to form the pocket portions. The plug forming method sandwiches a heated and softened container film between a first mold and a second mold and protrudes plugs of a convex shape provided in the second mold to be inserted into holes provided in the first mold, so as to form pocket portions in a shape corresponding to the plugs.

A recently proposed configuration of the pocket portion forming unit employs both the forming methods described above, with a view to reducing the wall thickness of the bottom portion in the pocket portion (as described in, for example, Patent Literature 1). This pocket portion forming unit includes a first mold having holes for the supply of the air (air supply holes); a second mold having insertion holes opposed to the air supply holes across a container film; and plugs arranged to lift up and down relative to the insertion holes.

A procedure of forming the pocket portions by this pocket portion forming unit first sandwiches a heated and softened container film between the two molds and places the plugs at a predetermined intermediate stop position such that end surfaces of the plugs are away from the container film. The procedure subsequently supplies the high-pressure air into the air supply holes, so as to expand predetermined forming regions of the pocket portions in the container film toward the plugs. The predetermined forming regions are expanded until the predetermined forming positions are supported by the plugs. The procedure subsequently moves the plugs and causes the predetermined forming regions to be pressed by the plugs toward an opposite direction to the expanding direction. The procedure eventually moves the plugs to a position where the plugs are protruded from the second mold and reverses the expanding direction of the predetermined forming regions to form the pocket portions.

PATENT LITERATURE

Patent Literature 1; JP 2005-111751A

The pocket portion forming unit described above is, however, likely to unintentionally destroy the balance between the thickness of the bottom portion and the thickness of the side portion in the pocket portion in the course of production of the blister sheet. As a result, this is likely to cause part of the pocket portion to be extremely thinned and to decrease the gas barrier property of the pocket portion. The side portion is generally made thinner than the bottom portion.

SUMMARY

One or more embodiments of the present invention provide a blister packaging machine that suppresses balance between the thickness of a bottom portion and the thickness of a side portion from being unintentionally destroyed and accordingly enables a pocket portion having good gas barrier property to be formed more reliably for a longer time period.

The following describes functions and advantageous effects of one or more embodiments.

A blister packaging machine according to one or more embodiments comprises a pocket portion forming unit configured to form a pocket portion that includes a bottom portion and a side portion, in a conveyed belt-like container film. The pocket portion forming unit is configured to adjust balance between thickness of the bottom portion and thickness of the side portion. The blister packaging machine further comprises an illumination unit (illumination device) placed downstream of the pocket portion forming unit and configured to irradiate at least the pocket portion with predetermined electromagnetic radiation; an imaging unit (imaging device) placed on a side opposite to the illumination unit across the container film and configured to obtain at least transmitted image data based on the electromagnetic radiation transmitted through the pocket portion; a side portion state detecting unit configured to detect a state with regard to the thickness of the side portion, based on the transmitted image data obtained by the imaging unit; and a controller configured to control operation of the pocket portion forming unit, based on a result of detection by the side portion state detecting unit.

The state with regard to the thickness of the side portion may be the thickness of the side portion itself (for example, the average thickness of the side portion or may be the state of a factor that varies with a variation in thickness of the side portion (for example, the transmittance of the electromagnetic radiation).

In the blister packaging machine of one or more embodiments, the side portion state detecting unit detects the state with regard to the thickness of the side portion in the pocket portion, based on the transmitted image data obtained by the imaging unit. The controller then performs feedback control of the operation of the pocket portion forming unit, based on the detected state with regard to the thickness of the side portion, so as to adjust balance between the thickness of the bottom portion and the thickness of the side portion in the formed pocket portion. Even when the balance between the thickness of the bottom portion and the thickness of the side portion is unintentionally destroyed in the course of production, this configuration automatically corrects the destroyed balance and thereby effectively prevents excessive wall thinning of the side portion. As a result, this configuration enables the pocket portion having good gas barrier property to be formed more reliably for a longer time period.

In the blister packaging machine according to one or more embodiments, the side portion state detecting unit may detect the state with regard to the thickness of the side portion, based on a state with regard to the thickness of the bottom portion in the transmitted image data.

A configuration employable to detect the state with regard to the thickness of the side portion may directly recognize the state of the side portion itself. In this configuration, there is a need to recognize the state of the entire circumference of the side portion by taking into account the gas barrier property. It is, however, likely to take a relatively long time for recognizing the state of the entire circumference of the side portion. This may fail to sufficiently respond to the high-speed production of a blister sheet.

There is a correlation between the thickness of the bottom portion and the thickness of the side portion. The thick bottom portion provides the thin side portion, whereas the thin bottom portion provides the thick side portion. In the blister packaging machine according to one or more embodiments, the side portion state detecting unit takes advantage of this correlation and detects the state with regard to the thickness of the side portion, based on the state with regard to the thickness of the bottom portion in the transmitted image data. Accordingly, this configuration enables information required for the thickness control of the pocket portion to be obtained in a shorter time period and sufficiently responds to the high-speed production of the blister sheet.

The bottom portion of the pocket portion is generally arranged to be substantially parallel to a non-forming region (flat region) of the pocket portion in the container film. When the imaging unit is placed such that an optical axis of a lens is perpendicular to the non-forming region (flat region), the obtained transmitted image data is likely to have a difference in transmission of the electromagnetic radiation with regard to an area corresponding to the bottom portion. Accordingly, this configuration enables the state with regard to the thickness of the bottom portion to be more accurately recognized and thereby enables the state with regard to the thickness of the side portion to be more accurately detected. As a result, this configuration ensures the thickness control of the pocket portion with the higher accuracy.

In the blister packaging machine according to one or more embodiments, the container film may be formed from a transparent resin material, and the illumination unit may be configured to emit ultraviolet light as the electromagnetic radiation.

The ultraviolet light has the lower transmittance and is more unlikely to transmit through the transparent container film, compared with visible light. The configuration according to one or more embodiments thus enables the state with regard to the thickness of the bottom portion and the state with regard to the thickness of the side portion to be more accurately detected, based on the transmitted image data. Accordingly, this configuration may ensure the thickness control of the pocket portion.

In the blister packaging machine according to one or more embodiments, the pocket portion forming unit may comprise a first mold having a predetermined first hole; a second mold having a second hole that is opposed to the first hole across the container film; a pressing element placed to be movable back and forth relative to the second hole; and an expanding unit configured to perform a film expanding operation that is at least one of supplying a predetermined gas to the first hole and supplying a negative pressure to the second hole.

The pocket portion forming unit may be configured to perform a process of sandwiching the container film between the two molds, placing the pressing element at an intermediate stop position set in advance to be away from the container film, and performing the film expanding operation to expand a predetermined forming region of the pocket portion in the container film toward the pressing element; and a process of pressing the expanded predetermined forming region toward the first hole by the pressing element, so as to form the pocket portion.

The pocket portion forming unit according to one or more embodiments performs the film expanding operation to expand the predetermined forming region of the pocket portion until the predetermined forming region is supported by the pressing element. Accordingly, changing the intermediate stop position of the pressing element changes the stretch amount of the predetermined forming region and thereby adjusts the balance between the thickness of the bottom portion and the thickness of the side portion in the pocket portion.

More specifically, setting the intermediate stop position of the pressing element to have a relatively large distance between the container film and the pressing element provides a relatively large stretch amount of the predetermined forming region of the pocket portion in the container film in the process of the film expanding operation, so as to make the predetermined forming region thin as a whole. The predetermined forming region is then pressed by the pressing element, so that the pocket portion is formed with an area corresponding to the bottom portion kept thin. As a result, the formed pocket portion has a relatively thin bottom portion and a relatively thick side portion.

Setting the intermediate stop position of the pressing element to have a relatively small distance between the container film and the pressing element, on the other hand, provides a relatively small stretch amount of the predetermined forming region in the process of the film expanding operation, so as to make the predetermined forming region thick as a whole. The predetermined forming region is then pressed by the pressing element, so that the pocket portion is formed with the area corresponding to the bottom portion kept thick and an area corresponding to the side portion stretched. As a result, the formed pocket portion has a relatively thick bottom portion and a relatively thin side portion.

As described above, the pocket portion forming device adjusts the balance between the thickness of the bottom portion and the thickness of the side portion in the pocket portion by changing the intermediate stop position of the pressing element. This configuration accordingly enables the balance adjustment of the thickness to be performed extremely easily.

The blister packaging machine according to one or more embodiments may further comprise a filling unit (filling device) placed downstream (is disposed on a downstream side) of the illumination unit and configured to fill a predetermined content into the pocket portion; and a filling controller configured to control an operation of the filling unit, based on the result of detection of the side portion state detecting unit and change over between permission and prohibition of filling of the content into the pocket portion.

In the blister packaging machine of one or more embodiments, when the side portion is extremely thin, the filling controller controls the filling unit not to fill the content into the pocket portion. In the case where the blister sheet is discarded due to the extreme thinness of the side portion, this configuration prevents the content from being discarded together with the blister sheet and thereby reduces the waste of the content. This configuration also does not require a troublesome work of, for example, taking the filled content out of the pocket portion for recycle of the content and accordingly enhances the productivity.

The blister packaging machine according to one or more embodiments may further comprise a filling unit placed downstream of the pocket portion forming unit and configured to fill a predetermined content into the pocket portion. The illumination unit may irradiate at least the pocket portion and the content with the electromagnetic radiation in downstream of the filling unit. The blister packaging machine may further comprise a content quality determination unit configured to determine quality of the content, based on the transmitted image data obtained by the imaging unit.

The configuration of one or more embodiments performs just not detection of the state with regard to the thickness of the side portion but determination of the quality of the content, based on the transmitted image data obtained by the imaging unit. This configuration accordingly simplifies the blister packaging machine and reduces an increase in manufacturing and other costs of the blister packaging machine.

DETAILED DESCRIPTION

Figure 1:
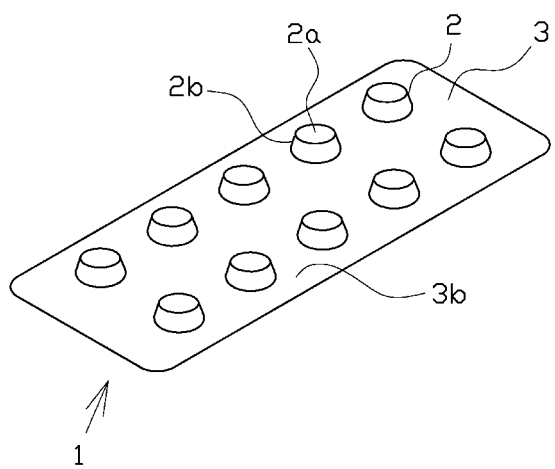
FIG. 1 is a perspective view illustrating a Press Through Package (PTP) sheet according to one or more embodiments.
Figure 2:
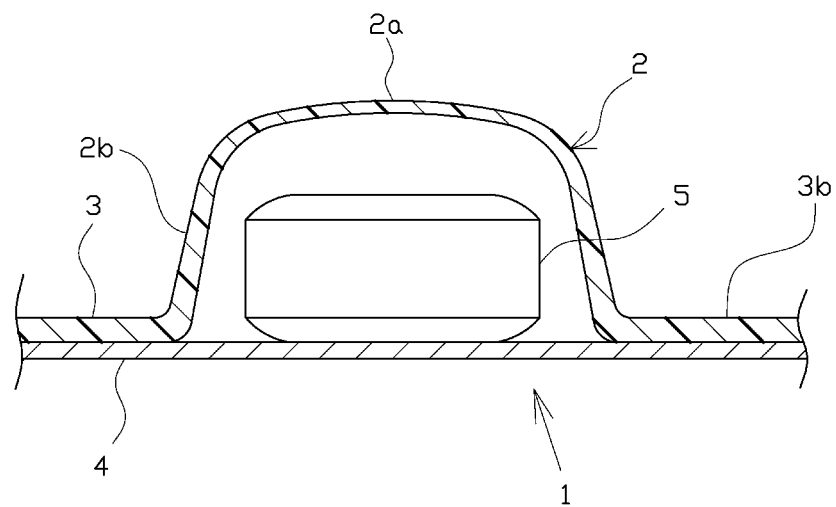
FIG. 2 is a partly enlarged sectional view illustrating the PTP sheet according to one or more embodiments.

The following describes embodiments with reference to drawings. A PTP sheet 1 that is the blister sheet is described first. As shown in FIG. 1 and FIG. 2, the PTP sheet 1 includes a container film 3 provided with a plurality of pocket portions 2, and a cover film 4 mounted to the container film 3 such as to close the respective pocket portions 2. One tablet 5 as a content is placed in each of the pocket portions 2.

The pocket portion 2 has a bottom portion 2a and a side portion 2b. The bottom portion 2a is a region that forms a bottom of the pocket portion 2 and is configured to be substantially parallel to a flat non-forming portion 3b that is a region of the container film 3 where the pocket portions 2 are not formed. According to one or more embodiments, the bottom portion 2a is a region of the pocket portion 2 that is configured to overlap with the tablet 5 along a direction perpendicular to the non-forming portion 3b. The side portion 2b is a cylindrical region that is located between the bottom portion 2a and the non-forming portion 3b. According to one or more embodiments, the side portion 2b is a region of the pocket portion 2 other than the bottom portion 2a.

The container film 3 is made of a transparent thermoplastic resin material, for example, PP (polypropylene) or PVC (polyvinyl chloride). The cover film 4 is, on the other hand, made of an opaque material (for example, aluminum foil) with a sealant comprised of, for example, a polypropylene resin, applied on a surface thereof.

The PTP sheet 1 is formed in an approximately rectangular shape in a plan view and is configured such that two pocket arrays are formed in a sheet short side direction and that each pocket array includes five pocket portions 2 arranged along a sheet longitudinal direction. Accordingly, a total of ten pocket portions 2 are formed. The number and the layout of the pocket portions 2 may, however, be changed.

Figure 3:
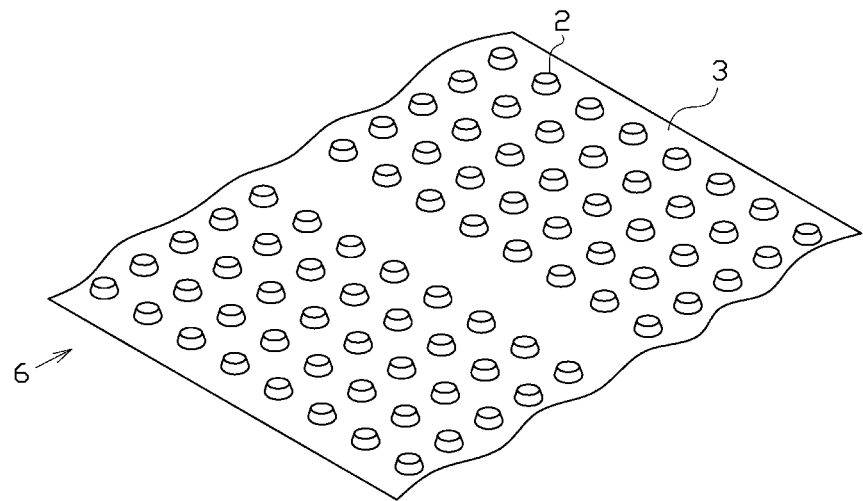
FIG. 3 is a perspective view illustrating a PTP film according to one or more embodiments.

The PTP sheet 1 is manufactured by punching sheets from a belt-like PTP film 6 (shown in FIG. 3) that is formed from the belt-like container film 3 and the belt-like cover film 4.

The following describes the general configuration of a PTP packaging machine 11 serving as the blister packaging machine to manufacture the PTP sheet 1 described above, with reference to FIG. 5.

A film roll of the belt-like container film 3 is wound in a roll form on a most upstream side of the PTP packaging machine 11. A pullout end of the container film 3 wound in the roll form is guided by a guide roll 13. The container film 3 is then laid on an intermittent feed roll 14 placed (disposed) on a downstream side of the guide roll 13. The intermittent feed roll 14 is coupled with a motor rotating in an intermittent manner, so as to convey the container film 3 intermittently.

A heating device 15 and a pocket portion forming device 16 serving as the pocket portion forming unit are sequentially placed along the conveyance path of the container film 3 between the guide roll 13 and the intermittent feed roll 14. In the state that the container film 3 is heated to be relatively soft by the heating device 15, the plurality of pocket portions 2 are formed simultaneously at predetermined positions of the container film 3 by the pocket portion forming device 16. Formation of the pocket portions 2 is performed during an interval between conveying operations of the container film 3 by the intermittent feed roll 14. The configuration of the heating device 15 and the pocket portion forming device 16 will be described later.

A formation state detecting device 21 is placed downstream of the pocket portion forming device 16 to be arranged between the guide roll 13 and the intermittent feed roll 14. The formation state detecting device 21 is a device configured to detect the state with regard to the thickness of the formed pocket portion 2. The configuration of the formation state detecting device 21 will be described later.

The container film 3 fed from the intermittent feed roll 14 is sequentially laid on a tension roll 18, a guide roll 19 and a film receiving roll 20 in this order. The film receiving roll 20 is coupled with a motor rotating at a fixed speed, so as to continuously convey the container film 3 at a fixed speed. The tension roll 18 is configured to pull the container film 3 in a direction of applying tension by an elastic force. This configuration prevents a slack of the container film 3 due to a difference between the conveying operation by the intermittent feed roll 14 and the conveying operation by the film receiving roll 20 and constantly keeps the container film 3 in the state of tension.

A tablet filling device 22 is placed along the conveyance path of the container film 3 between the guide roll 19 and the film receiving roll 20. The tablet filling device 22 serves as the filling unit to automatically fill the tablets 5 into the pocket portions 2. The tablet filling device 22 opens a shutter at every predetermined time interval to drop the tablet 5, in synchronism with the conveying operation of the container film 3 by the film receiving roll 20. Each of the pocket portions 2 is filled with the tablet 5 by this shutter opening operation. The operations of the tablet filling device 22 are controlled by a filling control device 82 described later.

A film roll of the belt-like cover film 4 is also wound on a roll form and is placed on a most upstream side.

A pullout end of the cover film 4 wound in the roll form is guided by a guide roll 24 to a heating roll 25. The heating roll 25 is pressed against to be in contact with the film receiving roll 20 described above. The container film 3 and the cover film 4 are accordingly fed into between the two rolls 20 and 25. The container film 3 and the cover film 4 pass through between the two rolls 20 and 25 in the heated and pressed contact state, so that the cover film 4 is mounted to the container film 3 such as to close the respective pocket portions 2. This series of operations manufactures the PTP film 6 with the tablets 5 filled in the respective pocket portions 2.

The PTP film 6 fed from the film receiving roll 20 is sequentially laid on a tension roll 27 and an intermittent feed roll 28 in this order. The intermittent feed roll 28 is coupled with a motor rotating in an intermittent manner, so as to convey the PTP film 6 intermittently. The tension roll 27 is configured to pull the PTP film 6 in a direction of applying tension by an elastic force. This configuration prevents a slack of the PTP film 6 due to a difference between the conveying operation by the film receiving roll 20 and the conveying operation by the intermittent feed roll 28 and constantly keeps the PTP film 6 in the state of tension.

The PTP film 6 fed from the intermittent feed roll 28 is sequentially laid on a tension roll 31 and an intermittent feed roll 32 in this order. The intermittent feed roll 32 is coupled with a motor rotating in an intermittent manner, so as to convey the PTP film 6 intermittently. The tension roll 31 is configured to pull the PTP film 6 in a direction of applying tension by an elastic force and thereby serves to prevent a slack of the PTP film 6 between these intermittent feed rolls 28 and 32.

A slit formation device 33 and a stamping device 34 are sequentially placed along the conveyance path of the PTP film 6 between the intermittent feed roll 28 and the tension roll 31. The slit formation device 33 serves to form a cutting slit at predetermined positions of the PTP film 6. The stamping device 34 serves to stamp a mark at predetermined positions of the PTP film 6 (for example, in tag portions).

The PTP film 6 fed from the intermittent feed roll 32 is sequentially laid on a tension roll 35 and a continuous feed roll 36 in this order on a downstream side of the intermittent feed roll 32. A sheet punching device 37 is placed along the conveyance path of the PTP film 6 between the intermittent feed roll 32 and the tension roll 35. The sheet punching device 37 serves to punch out the outer periphery of each portion of the PTP film 6 in the unit of PTP sheet 1.

The respective PTP sheets 1 punched out by the sheet punching device 37 are conveyed by an extraction conveyor 38 and are temporarily accumulated in a finished product hopper 39. When a defective signal is input from the filling control device 82 described later into a defective sheet discharge mechanism 40 that is configured to selectively discharge the PTP sheet 1, the PTP sheet 1 determined as defective is separately discharged by the defective sheet discharge mechanism 40 and is transferred to a non-illustrated defective hopper.

A cutting device 41 is placed on a downstream side of the continuous feed roll 36. A scrap portion 42 that remains in a belt-like form after punching out by the sheet punching device 37 is guided by the tension roll 35 and the continuous feed roll 36 described above and is subsequently led to the cutting device 41. A driven roll is pressed against to be in contact with the continuous feed roll 36, so that the scrap portion 42 is placed and conveyed between the driven roll and the continuous feed roll 36. The cutting device 41 serves to cut the scrap portion 42 into predetermined dimensions. The cut pieces of the scrap portion 42 are accumulated in a scrap hopper 43 and are disposed separately.

Each of the rolls 14, 19, 20, 28, 31, 32 and the like described above is arranged such that the roll surface is opposed to the pocket portions 2. The surface of each of the rolls 14 and the like has recesses that are formed to place the pocket portions 2 therein. This configuration basically suppresses the pocket portions 2 from being crushed. The feeding operation with the pocket portions 2 placed in the recesses of each of the rolls 14 and the like achieves the reliable intermittent feed and continuous feed.

Figure 7:
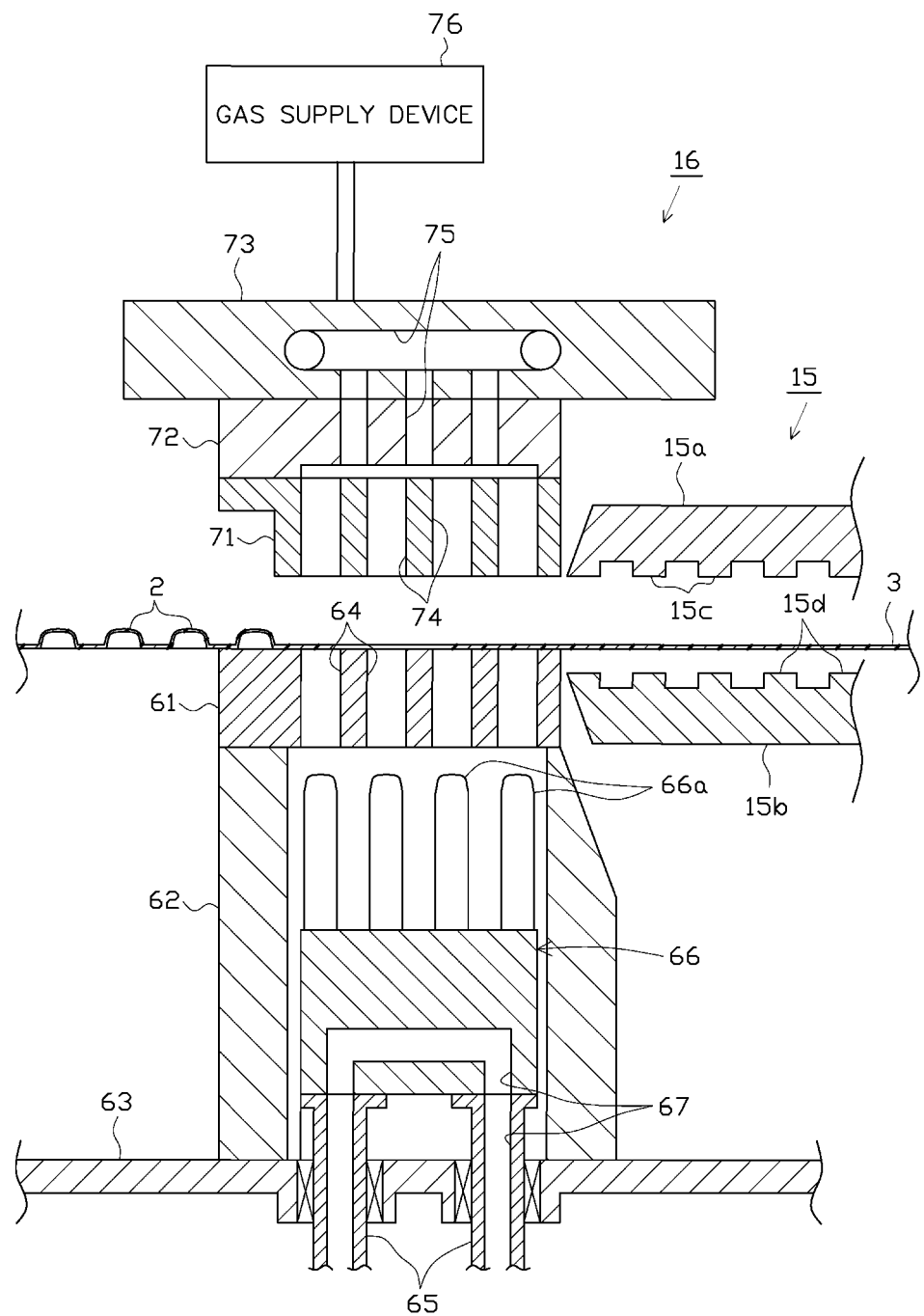
FIG. 7 is a partly broken front view illustrating the schematic configuration of a pocket portion forming device and a heating device according to one or more embodiments.

The following describes the configuration of the heating device 15 and the pocket portion forming device 16 with reference to FIG. 7.

The heating device 15 includes an upper heater plate 15*a* and a lower heater place 15*b*. The respective heater plates 15*a* and 15*b* are configured to be heated by a non-illustrated heater. The respective heater plates 15*a* and 15*b* are arranged across the conveyance path of the container film 3 to be movable in a direction of coming closer to or going away from the container film 3.

The heater plates 15*a* and 15*b* respectively have a plurality of protrusions 15*c* and 15*d* provided at positions corresponding to predetermined forming regions of the pocket portions 2 in the container film 3. As the respective heaters 15a and 15b come closer to the intermittently fed container film 3 during a temporary stop of the container film 3, the container film 3 is sandwiched between the protrusions 15c and 15d to be heated and softened partly (at spots). According to one or more embodiments, contact regions of the protrusions 15c and 15d that come into contact with the container film 3 are formed to be slightly smaller than the planar shape of the pocket portions 2.

The pocket portion forming device 16 includes a lower mold 61 as the second mold and an upper mold 71 as the first mold. The lower mold 61 is fixed to a support base 63 in a stationary state via a cylindrical lower mold chamber 62. The lower mold 61 also has a plurality of insertion holes 64 at positions corresponding to the positions of the pocket portions 2. According to one or more embodiments, the insertion hole 64 corresponds to the second hole.

A plurality of through holes is formed in the support base 63, and rod-like sliders 65 are inserted in the through holes via bearing mechanisms. The sliders 65 are configured to be movable up and down by means of a non-illustrated cam mechanism. A pocket portion forming mold 66 is fixed on the sliders 65. The pocket portion forming mold 66 is provided with a plurality of plugs 66a that is configured to be inserted through the insertion holes 64 and that are extended in a vertical direction to serve as rod-like pressing elements. The plug 66a has a free end formed in a shape corresponding to an inner face of the pocket portion 2. The pocket portion forming mold 66 moves up and down with the sliders 65 that are moved up and down by driving the cam mechanism. The lower mold 61 and the pocket portion forming mold 66 may be replaceable according to the type of the PTP sheet 1 that is to be produced.

A circulation path 67 is formed inside of the sliders 65 and the pocket portion forming mold 66, such that cooling water (or warm water) is circulated through. This configuration suppresses a variation in surface temperature at the respective plugs 66a.

The plugs 66a are placed at an initial position, at an intermediate stop position and at a protrusion position in this order in a process of forming the pocket portions 2 and is eventually returned to the initial position. The initial position is a position where the plugs 66a are placed at a start of the process of forming the pocket portions 2. The plugs 66a placed at this position are located below the insertion holes 64 and outside of the insertion holes 64. The intermediate stop position is a position where the plugs 66a are placed in an intermediate stage of the process of forming the pocket portions 2. The plugs 66a placed at this position are located in the insertion holes 64 such as to be arranged away from the container film 3 across a predetermined interval. The protrusion position is a position where the plugs 66a are placed in a last stage of the process of forming the pocket portions 2. The plugs 66a placed at this position have end surfaces that are protruded from the lower mold 61 by a distance corresponding to the depth of the pocket portions 2. At least the intermediate stop position among these positions is set by a control device 81 described later, and the operations of the plugs 66a are controlled by the control device 81.

The upper plate 71 is, on the other hand, fixed to a vertically movable upper plate 73 via a plate 72 and is configured to be movable along a direction of coming closer to or going away from the lower mold 61. The upper mold 71 has gas supply holes 74 provided as the first holes at positions opposed to the insertion holes 64 of the lower mold 61. A gas supply path 75 is formed inside of the plate 72 and the upper plate 73 to communicate with the gas supply holes 74. A predetermined high-pressure gas (an inert gas, the air according to one or more embodiments) is supplied to the gas supply path 75 by a gas supply device 76 configured by, for example, a compressor. According to one or more embodiments, the gas supply device 76 serves as the expanding unit.

Figure 4:
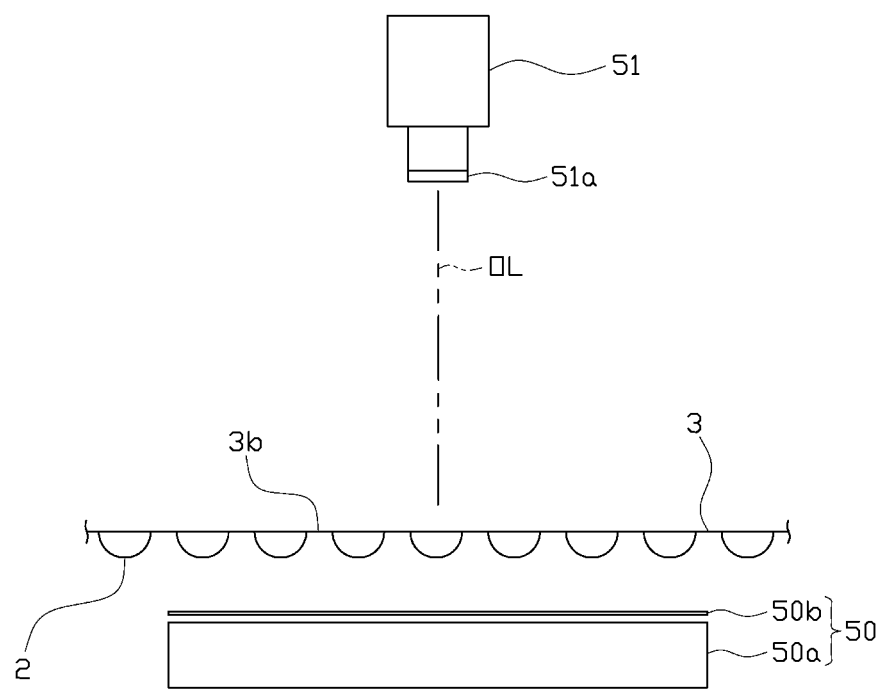
FIG. 4 is a diagram mainly illustrating an illumination device and a camera according to one or more embodiments.
Figure 5:
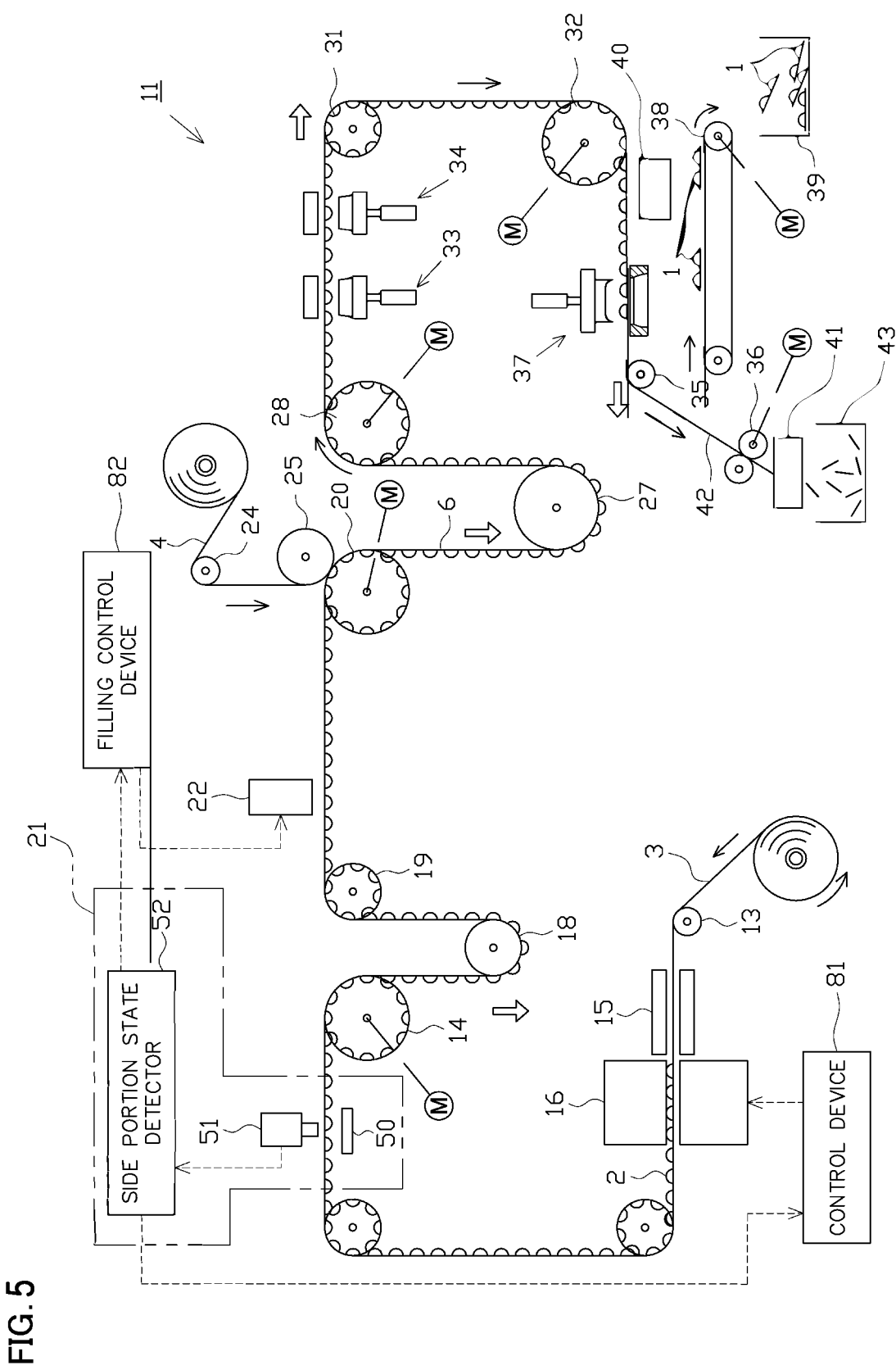
FIG. 5 is a schematic configuration diagram illustrating a PTP packaging machine according to one or more embodiments.
Figure 6:
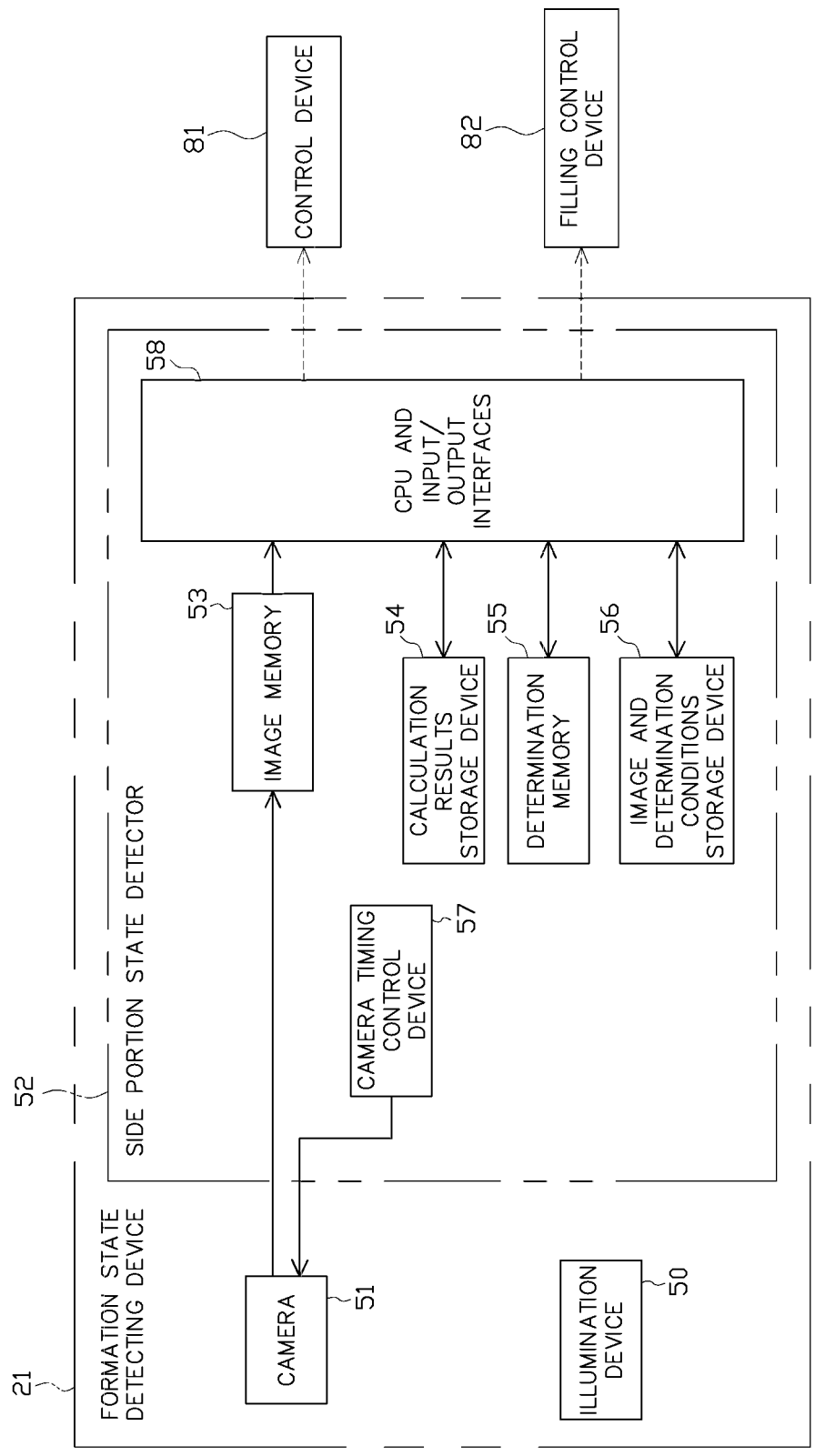
FIG. 6 is a block diagram illustrating the electrical configuration of a formation state detecting device according to one or more embodiments.

The following describes the formation state detecting device 21. The formation state detecting device 21 includes an illumination device 50 serving as the illumination unit, a camera 51 serving as the imaging unit, and a side portion state detector 52 serving as the side portion state detecting unit as shown in FIGS. 4 to 6.

The illumination device 50 is configured to irradiate at least the respective pocket portions 2 of the container film 3 with a predetermined electromagnetic radiation emitted from a protrusion side of the pocket portions 2. The illumination device 50 includes an electromagnetic radiation device 50a and a diffuser plate 50b provided to cover the electromagnetic radiation device 50a, and is configured to enable plane emission. The illumination device 50 according to one or more embodiments irradiates the container film 3 with an electromagnetic radiation including ultraviolet light.

The camera 51 has a sensitivity in a wavelength range of the electromagnetic radiation emitted from the illumination device 50. The camera 51 is placed on an opening side of the pocket portions 2 of the container film 3 and is configured such that an optical axis OL of a lens of the camera 51 is perpendicular to the non-forming portion 3b of the container film 3. A bandpass filter 51a is placed corresponding to the lens of the camera 51. The bandpass filter 51a is provided such as to enable only the ultraviolet light to enter the lens, for example, only the electromagnetic radiation having the wavelength of 253±20 nm to enter the lens. Providing the bandpass filter 51a causes only the ultraviolet light transmitted through the container film 3 out of the electromagnetic radiation emitted from the illumination device 50 to be subjected to two-dimensional imaging by the camera 51. A modification may omit the bandpass filter 51a by configuring the electromagnetic radiation device 50a to emit only the ultraviolet light.

Transmitted image data obtained by the camera 51 is luminance image data having different luminance values at respective positions on the basis of a difference in transmittance of the ultraviolet light. A transmitted image based on this data indicates the presence of the plurality of pocket portions 2 formed by one single operation of the pocket portion forming device 16. In other words, the camera 51 simultaneously takes an image of the plurality of pocket portions 2 formed by one single operation of the pocket portion forming device 16. The transmitted image data thus obtained is input into the side portion state detector 52.

The side portion state detector 52 is configured by a computer system including, for example, a CPU that serves as the arithmetic unit, a ROM that stores various programs, and a RAM that temporarily stores various data, for example, arithmetic data and input and output data. The side portion state detector 52 includes an image memory 53, a calculation results storage device 54, a determination memory 55, an image and determination conditions storage device 56, a camera timing control device 57 and a CPU and input/output interfaces 58.

The image memory 53 is configured to store image data, such as transmitted image data taken by the camera 51. The state with regard to the thickness of the side portion 2b is detected, based on the transmitted image data stored in this image memory 53. Masking image data obtained by a masking process of the transmitted image data is also stored in the image memory 53. The image data may be subjected to a process such as shading correction. The shading correction is performed to correct a variation in lightness of the light caused by a difference in position.

The calculation results storage device 54 is configured to store the transmittances of the ultraviolet light at respective positions of the bottom portion 2a included in the transmitted image data, the thicknesses at the respective positions of the bottom portion 2a obtained from the transmittances, the average thickness of the bottom portion 2a, and statistical data obtained by a stochastic process of these data with regard to the thickness. According to one or more embodiments, the average thickness of the bottom portion 2a indicates the state with regard to the thickness of the bottom portion 2a and also indicates the state with regard to the thickness of the side portion 2b.

The determination memory 55 is configured to store various information used for detection of the state with regard to the thickness of the pocket portion 2. The information stored in the determination memory 55 includes, for example, the dimensions of the pocket portion 2, the shape and the dimensions of a window frame that is used to define an area of the bottom portion 2a, a table showing a relationship between the luminance and the transmittance, and a table showing a relationship between the transmittance and the thickness.

The image and determination conditions storage device 56 is configured by, for example, a hard disk device. The image and determination conditions storage device 56 is configured to store, for example, the date and the time of state detection and determination conditions used for the state detection.

The camera timing control device 57 is configured to control the imaging timing of the camera 51. This imaging timing is controlled on the basis of a signal from a non-illustrated encoder provided in the PTP packaging machine 11. The camera 51 is controlled to take an image every time the container film 3 is fed by a predetermined amount.

The CPU and input/output interfaces 58 is configured to perform various controls in the side portion state detector 52. The CPU and input/output interface 58 executes various processing programs for detection of the state with regard to the thickness of the side portion 2b with using the storage contents of the determination memory 55 and the like. The CPU and input/output interfaces 58 is also configured to send and receive signals to and from the control device 81 described later.

When transmitted image data is input from the camera 51, the side portion state detector 52 having the configuration described above stores the transmitted image data into the image memory 53 and performs various processes. The various processes include, for example, a masking process of the stored transmitted image data, a process of calculating the transmittances with regard to masking image data obtained by the masking process, a process of calculating the thicknesses at the respective positions of the bottom portion 2a and the average thickness of the bottom portion 2a based on the transmittances, and a process of storing the calculated average thickness as indication of the state with regard to the thickness of the side portion 2b.

More specifically, the masking process is performed to process the transmitted image data by using a window frame for defining the area of the bottom portion 2a stored in the determination memory 55 and generate masking image data by extraction of the area corresponding to the bottom portion 2a from the transmitted image data. The masking image data is stored into the image memory 53.

The process of calculating the transmittances is performed to detect the luminance values in respective pixels of the area corresponding to the bottom portion 2a from the masking image data and calculate the transmittances at the respective positions of the bottom portion 2a by using the detected luminance values and the table that shows the relationship between the luminance and the transmittance and that is stored in the determination memory 55. The calculated transmittances are stored into the calculation results storage device 54.

The process of calculating the thicknesses calculates the thicknesses at the respective positions of the bottom portion 2a by using the calculated transmittances at the respective positions of the bottom portion 2a and the table that shows the relationship between the transmittance and the thickness and that is stored in the determination memory 55. The process also calculates the average thickness of the bottom portion 2a by using the calculated thicknesses at the respective positions of the bottom portion 2a. This average thickness of the bottom portion 2a is not an average thickness of the bottom portion 2a with regard to one pocket portion 2 but is an average thickness of the respective bottom portions 2a with regard to a plurality of pocket portions 2 simultaneously formed by the pocket portion forming device 16. The calculated thicknesses at the respective positions of the bottom portion 2a are stored into the calculation results storage device 54. The process may calculate an average thickness of the bottom portion 2a with regard to a predetermined pocket portion 2 selected out of the plurality of pocket portions 2. The average thickness may be replaced with another thickness-related factor, for example, an intermediate value or a maximum value of the thickness.

The process of storing the state with regard to the thickness stores the calculated average thickness of the bottom portion 2a as indication of the state with regard to the thickness of the side portion 2b into the calculation results storage device 54. In other words, according to one or more embodiments, the state with regard to the thickness of the side portion 2b is detected, based on the state with regard to the thickness of the bottom portion 2a. The state with regard to the thickness of the side portion 2b is not defined from the thickness or the transmittance of the side portion 2b itself but is indirectly defined from the information with regard to the thickness of the bottom portion 2a in relation to the thickness of the side portion 2b.

The side portion state detector 52 outputs the information with regard to the calculated average thickness of the bottom portion 2a to the control device 81 serving as the controller and to the filling control device 82 serving as the filling controller. The following describes the control device 81 and the filling control device 82.

The control device 81 is configured by a computer system including a CPU, a RAM and the like, similarly to the side portion state detector 52. The control device 81 has a function of sending various information including the image data stored in the side portion state detector 52 to a predetermined display unit (not shown), such as a display. This function enables the information stored in the side portion state detector 52 to be displayed on the display unit.

The control device 81 sets the intermediate stop position of the plugs 66a and stores the set information with regard to the intermediate stop position. Additionally, the control device 81 stores information with regard to the initial position of the plugs 66a and information with regard to the protrusion position of the plugs 66a. The information with regard to the initial position and the information with regard to the protrusion position may be changed according to the depth of the pocket portions 2 in the PTP sheet 1 that is to be manufactured.

According to one or more embodiments, the control device 81 sets the intermediate stop position by a method described below. When the information with regard to the average thickness of the bottom portion 2a is input from the side portion state detector 52, the control device 81 calculates a thickness difference by subtracting a thickness reference value stored in advance from the input average thickness. The thickness reference value indicates an ideal average thickness of the bottom portion 2a of the pocket portion 2. After calculation of the thickness difference, the control device 81 obtains a position adjustment amount of the plugs 66a by using the calculated thickness difference and an adjustment amount calculation table stored in advance, and sets a new intermediate stop position, based on this position adjustment amount. The adjustment amount calculation table is a table showing a relationship between the thickness difference and the position adjustment amount of the plugs 66a for cancelling the thickness difference. This table provides a negative value of the position adjustment amount against a positive thickness difference and provides a positive value of the position adjustment amount against a negative thickness difference. The larger thickness difference gives the larger absolute value of the position adjustment amount. The thickness difference of 0 gives the position adjustment amount of 0.

For example, in the case of a positive thickness difference, i.e., in the case where the average thickness of the bottom portion 2a of the pocket portion 2 is larger than the thickness reference value, the control device 81 obtains a negative value of the position adjustment amount, based on the adjustment amount calculation table. The control device 81 then sets a position lower than the current intermediate stop position by the absolute value of this position adjustment amount, as a new intermediate stop position.

For example, in the case of a negative thickness difference, i.e., in the case where the average thickness of the bottom portion 2a is smaller than the thickness reference value, on the other hand, the control device 81 obtains a positive value of the position adjustment amount, based on the adjustment amount calculation table. The control device 81 then sets a position upper than the current intermediate stop position by the absolute value of this position adjustment amount, as a new intermediate stop position.

When the newly set intermediate stop position is higher than a predetermined upper limit position that is set in advance or is lower than a predetermined lower limit position that is set in advance, the control device 81 determines that the newly set intermediate stop position is inappropriate and performs a predetermined abnormality responding process. The abnormality responding process may be, for example, a process of informing an abnormality or a process of urgently stopping the operation of the PTP packaging machine 11.

Figure 8:
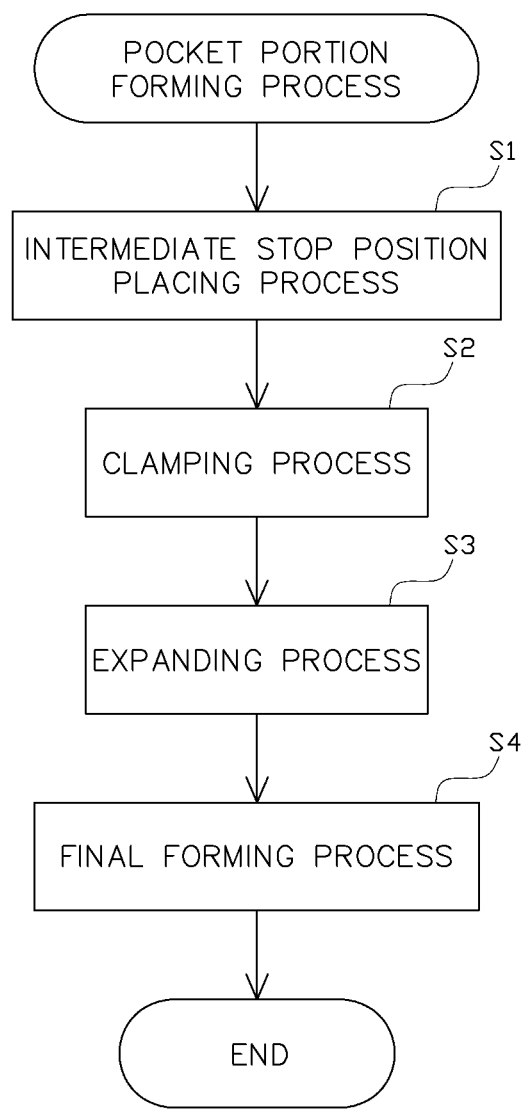
FIG. 8 is a flowchart showing a pocket portion forming process according to one or more embodiments.
Figure 9:
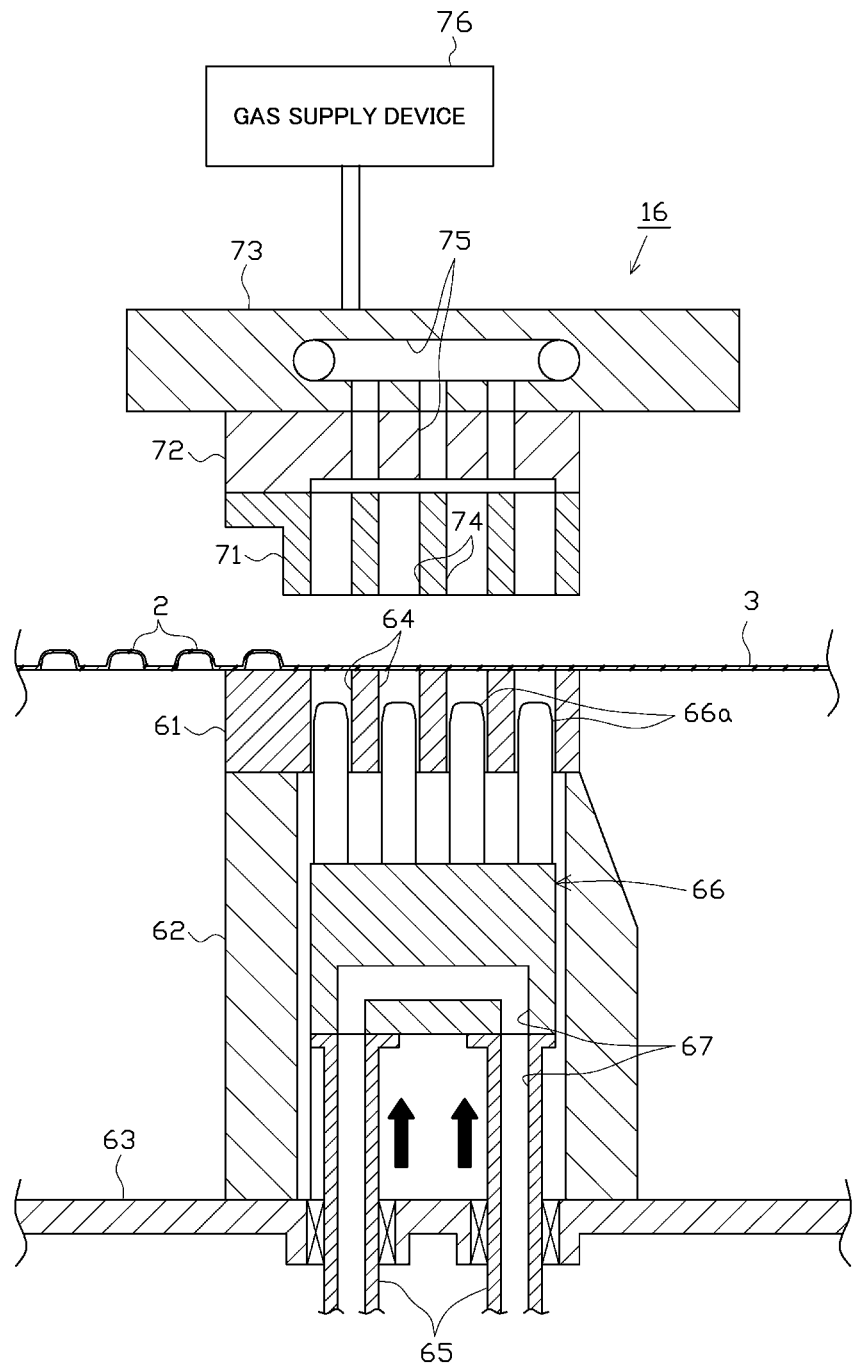
FIG. 9 is a partly broken front view illustrating the schematic configuration of the pocket portion forming device in an intermediate stop position placing process according to one or more embodiments.

The following describes a forming process of the pocket portions 2 performed by control of the control device 81 with reference to FIG. 8. The forming process of the pocket portions 2 first performs an intermediate stop position placing process S1. The intermediate stop position placing process S1 moves the sliders 65 to move the pocket portion forming mold 66 upward and thereby move up the plugs 66a located at the initial position (as shown in FIG. 9). When the plugs 66a reach the set intermediate stop position, the intermediate stop position placing process S1 stops the move of the sliders 65 and causes the plugs 66a to be located at the intermediate stop position. In this state, the end surfaces of the plugs 66a are located away from the container film 3 by a predetermined distance. This predetermined distance is generally smaller than the depth of the pocket portions 2.

Figure 10:
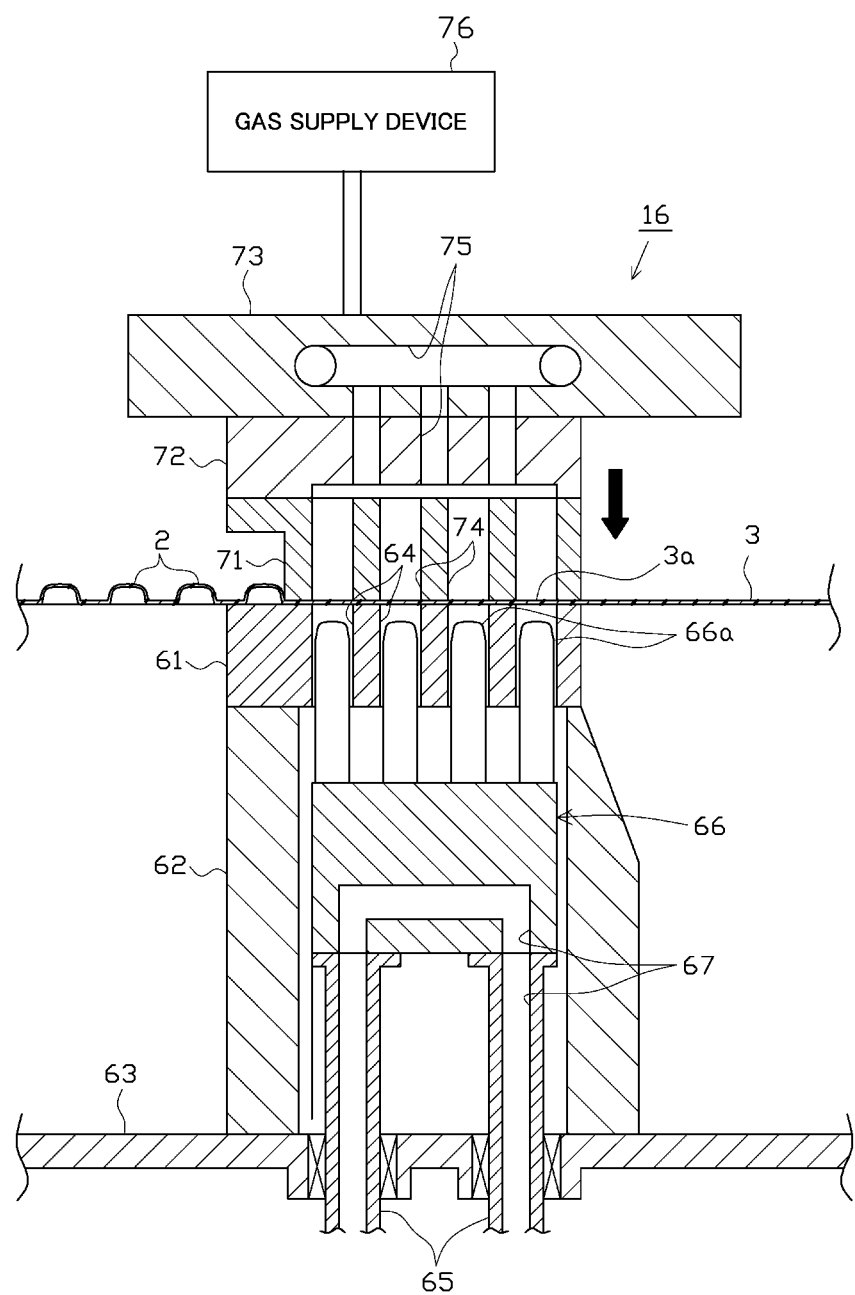
FIG. 10 is a partly broken front view illustrating the schematic configuration of the pocket portion forming device in a clamping process according to one or more embodiments.

Subsequently, a clamping process S2 moves the upper mold 71 downward, such that the container film 3 is sandwiched between the lower mold 61 in the stationary state and the upper mold 71 (as shown in FIG. 10). In this state, ring-shaped areas of the container film 3 located around predetermined forming regions 3a that are target areas where the pocket portions 2 are respectively to be formed, is sandwiched between the respective molds 61 and 71. The intermediate stop position placing process S1 and the clamping process S2 may be performed simultaneously, or the clamping process S2 may be performed prior to the intermediate stop position placing process S1.

Figure 11:
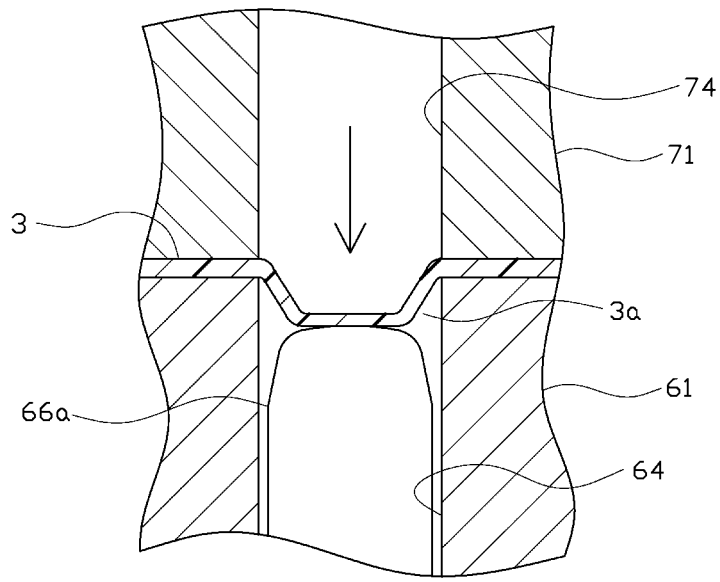
FIG. 11 is a sectional diagram illustrating a container film and the like in an expanding process according to one or more embodiments.

Subsequently, an expanding process S3 supplies a gas from the gas supply device 76 to the gas supply holes 74 via the gas supply paths 75 and thereby sprays the predetermined forming regions 3a of the pocket portions 2 in the container film 3 with the compressed air from the surface side (upper side) of the container film 3. According to one or more embodiments, the supply of the gas to the gas supply holes 74 corresponds to the film expanding process. Supplying the gas causes the predetermined forming regions 3a to be expanded in an opposite direction (downward direction) to the protruding direction (upward direction) of the pocket portions 2, to be stretched and to be thinned (as shown in FIG. 11). The predetermined forming regions 3a are expanded to be supported by the end surfaces of the plugs 66a. When the predetermined forming regions 3a are expanded by supplying the gas, the expanded predetermined forming regions 3 have substantially the same thicknesses as a whole.

The stretch amount of the container film 3 and the thicknesses of the predetermined forming regions 3a are changed according to the intermediate stop position of the plugs 66a. A relatively high intermediate stop position of the plugs 66a provides a relatively small stretch amount of the container film 3 and thereby provides the predetermined forming regions 3a in a generally thick state. A relatively low intermediate stop position of the plugs 66a, on the other hand, provides a relatively large stretch amount of the container film 3 and thereby provides the predetermined forming regions 3a in a generally thin state.

Figure 12:
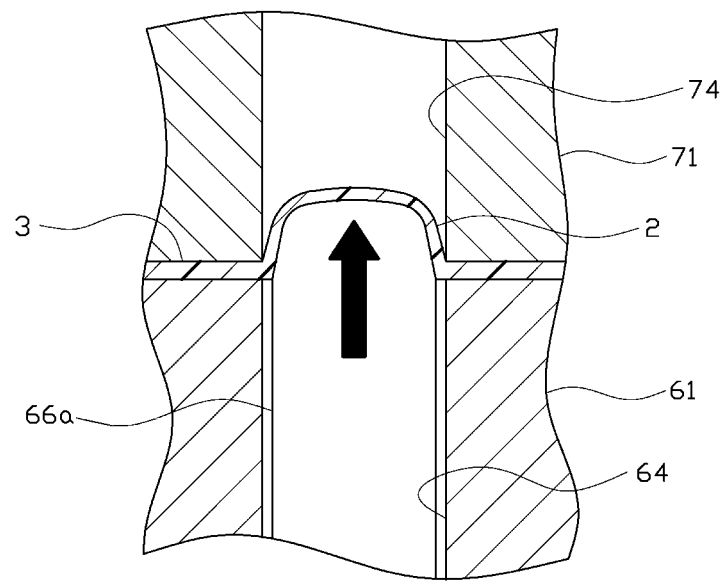
FIG. 12 is a sectional diagram illustrating the container film and the like in a final forming process according to one or more embodiments.

Subsequently, a final forming process S4 moves the plugs 66a upward to be located at the protrusion position. As a result, the expanding direction of the predetermined forming regions 3a is reversed to form the pocket portions 2 having a predetermined depth (as shown in FIG. 12). In the case of deforming the container film 3 by pressing, an area of the predetermined forming region 3a corresponding to the bottom portion 2a is in contact with the plug 66a to be cooled down and is thus hardly stretched. Accordingly, when the intermediate stop position is set to the relatively high position to provide the predetermined forming region 3a in the generally thick state, the area corresponding to the bottom portion 2a is maintained thick in the process of pressing by the plug 66a. This results in providing the side portion 2b of a relatively thin wall in the formed pocket portion 2. When the intermediate stop position is set to the relatively low position to provide the predetermined forming region 3a in the generally thin state, on the other hand, the area corresponding to the bottom portion 2a is maintained thin in the process of pressing by the plug 66a. This results in providing the side portion 2b of a relatively thick wall in the formed pocket portion 2. Adjusting the wall thickness of the predetermined forming region 3a by regulating the intermediate stop position of the plug 66a in this manner allows for adjustment of the balance between the thickness of the bottom portion 2a and the thickness of the side portion 2b in the pocket portion 2 eventually formed.

After the final forming process S4, the pocket portion forming process places the plugs 66a at the initial position, releases clamping of the container film 3 by the respective molds 61 and 71, and is then terminated.

The following describes the filling control device 82. The filling control device 82 serves to change over between permission and prohibition of filling of the tablet 5 into the pocket portion 2 by the tablet filling device 22 and is configured by a computer system including a CPU, a RAM and the like, similarly to the side portion state detector 52. When the information with regard to the average thickness of the bottom portion 2a is input from the side portion state detector 52, the filling control device 82 determines whether this average thickness is greater than a quality determination reference value set in advance. When the average thickness is equal to or less than the quality determination reference value, i.e., when the bottom portion 2a is expected to be sufficiently thin and the side portion 2b is expected to have a sufficient thickness, the filling control device 82 controls the tablet filling device 22 to fill the tablet 5 into each of the pocket portions 2 having this average thickness. When the average thickness is greater than the quality determination reference value, i.e., when the bottom portion 2a is expected to be excessively thick and the side portion 2b is expected to have an insufficient thickness, on the other hand, the filling control device 82 controls the tablet filling device 22 not to fill the tablet 5 into each of the pocket portion 2 having this average thickness.

When the side portion 2b is expected to have an insufficient thickness, the filing control device 82 sends a defective signal to the defective sheet discharge mechanism 40. As a result, the PTP sheet 1 related to the defective signal (defective sheet) is discharged by the defective sheet discharge mechanism 40. According to a modification, the control device 81 may be configured to have the functions of the filling control device 82 and may thus be integrated with the filling control device 82.

As described above in detail, even when the balance between the thickness of the bottom portions 2a and the thickness of the side portions 2b is unintentionally destroyed in the course of production of the PTP sheet 1, the configuration of one or more embodiments automatically corrects the destroyed balance and thereby effectively prevents excessive wall thinning of the side portions 2b. As a result, this configuration enables the pocket portions 2 having good gas barrier property to be formed more reliably for a longer time period.

Furthermore, according to one or more embodiments, the side portion state detector 52 detects the state with regard to the thickness of the side portion 2b, based on the state with regard to the thickness of the bottom portion 2a in the transmitted image data, by taking advantage of such a correlation between the thickness of the bottom portion 2a and the thickness of the side portion 2b that the thick bottom portion 2a provides the thin side portion 2b and the thin bottom portion 2a provides the thick side portion 2b. This configuration enables information required for thickness control of the pocket portions 2 to be obtained in the shorter time period and sufficiently responds to the high-speed production of the PTP sheet 1.

Moreover, the bottom portion 2a is arranged to be substantially parallel to the non-forming region 3b of the container film 3. It is thus likely to cause a difference in transmission of the electromagnetic radiation in the area of the obtained transmitted image data corresponding to the bottom portion 2a. This configuration accordingly enables the state with regard to the thickness of the bottom portion 2a to be more accurately recognized and thereby enables the state with regard to the thickness of the side portion 2b to be more accurately detected. As a result, this configuration ensures the more accurate thickness control of the pocket portions 2.

Additionally, the ultraviolet light has the lower transmittance and is more unlikely to transmit through the transparent container film 3, compared with the visible light. The configuration of one or more embodiments thus enables the state with regard to the thickness of the bottom portion 2a and the state with regard to the thickness of the side portion 2b to be more accurately detected, based on the transmitted image data. Accordingly, this configuration may ensure the thickness control of the pocket portions 2.

Changing the intermediate stop position of the plugs 66a allows for adjustment of the balance between the thickness of the bottom portion 2a and the thickness of the side portion 2b. Accordingly, the configuration of one or more embodiments enables the balance adjustment of the thickness to be performed extremely easily.

Additionally, when the side portion 2b is extremely thin, the filling control device 82 controls the tablet filling device 22 not to fill the tablet 5 into the pocket portion 2. In the case where the PTP sheet 1 is discarded due to the extreme thinness of the side portions 2b, this configuration prevents the tablets 5 from being discarded together with the PTP sheet 1 and thereby reduces the waste of the tablets 5. This configuration also does not require a troublesome work of, for example, taking the filled tablets 5 out of the pocket portions 2 for recycle of the tablets 5 and accordingly enhances the productivity.

The present invention is not limited to the description of the above embodiments but may be implemented, for example, by configurations described below. The present invention may also be naturally implemented by applications and modifications other than those illustrated below.

(a) According to one or more embodiments described above, the illumination device 50 is configured to emit the electromagnetic radiation including the ultraviolet light. The wavelength of the electromagnetic radiation emitted from the illumination device may be changed according to the material and the color of the container film 3. For example, when the container film 3 is formed from an opaque material made of, for example, aluminum, X rays may be emitted from the illumination device. In another example, when the container film 3 is formed from a colored translucent material, visible light such as white light may be emitted from the illumination device.

(b) One or more embodiments described above are configured to adjust the balance between the thickness of the bottom portion 2a and the thickness of the side portion 2b, based on the thickness of the bottom portion 2a (average thickness). A modification may be configured to adjust the balance of the thicknesses, based on the transmittance of the electromagnetic radiation in the bottom portion 2a.

One or more embodiments described above are also configured to detect the state with regard to the thickness of the side portion 2b, based on the state with regard to the thickness of the bottom portion 2a. In other words, one or more embodiments are configured to detect the state with regard to the thickness of the side portion 2b indirectly from the state with regard to the thickness of the bottom portion 2a. A modification may be configured to directly detect the state with regard to the thickness of the side portion 2b by obtaining the thickness of the side portion 2b or the transmittance of the electromagnetic radiation in the side portion 2b. In the modified configuration of directly detecting the thickness of the side portion 2b or the like, a camera may be provided for each pocket portion 2 or for each area including a few pocket portions 2, with a view to detecting the thickness along the whole circumference of the side portion 2b or the like with the high accuracy.

(c) One or more embodiments described above are configured to adjust the wall thickness of the predetermined forming regions 3a and thereby the wall thickness of the pocket portions 2 by regulating the intermediate stop position of the plugs 66a. A modification may be configured to adjust the wall thickness of the predetermined forming regions 3a and thereby the wall thickness of the pocket portions 2 by placing the plugs 66a at the initial position to ensure a sufficient distance between the plugs 66a and the container film 3 and then regulating the amount of the gas supplied from the gas supply device 76 or the like.

(d) When the container film 3 is formed from an opaque material made of, for example, aluminum, the pocket portion forming device used may be a pocket portion forming device (described in JP 2002-160289A) provided with first plugs configured to preliminarily press and stretch the container film 3 and second plugs configured to further press the regions of the container film 3 preliminarily stretched by the first plugs to eventually form the pocket portions 2.

In this pocket portion forming device, setting a large pressing amount (stroke amount) of the container film 3 by the first plugs forms the pocket portions 2 having relatively thin bottom portions 2a and relatively thick side portions 2b. Setting a small pressing amount (stroke amount) of the container film 3 by the first plugs, on the other hand, forms the pocket portions having relatively thick bottom portions 2a and relatively thin side portions 2b. Accordingly, the balance between the thickness of the bottom portion 2a and the thickness of the side portion 2b may be adjusted by regulating the pressing amount by the first plugs.

Figure 13:
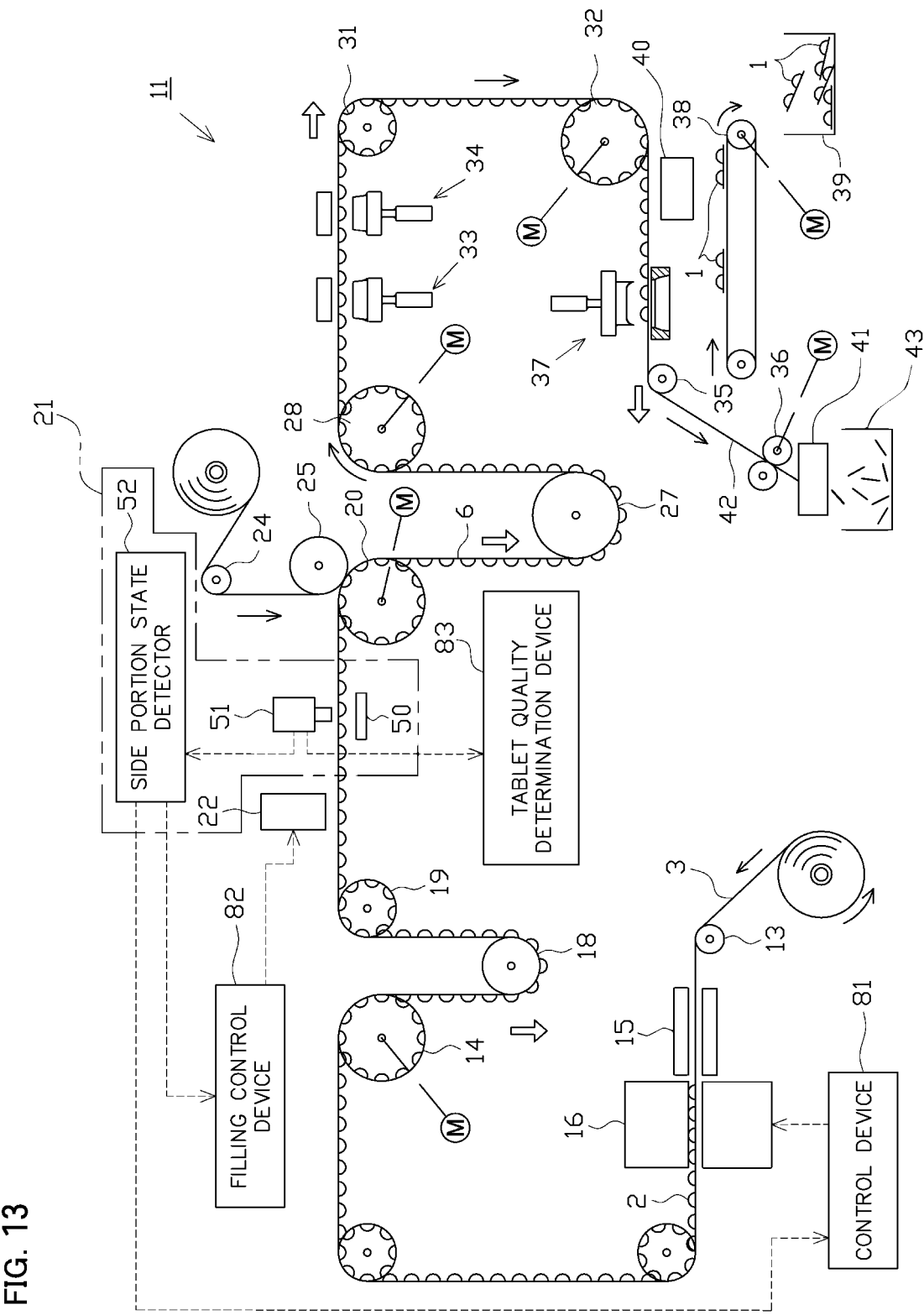
FIG. 13 is a schematic configuration diagram illustrating a PTP packaging machine according to one or more embodiments.

(e) According to one or more embodiments described above, the illumination device 50 and the camera 51 are placed upstream of the tablet filling device 22. According to a modification, however, as shown in FIG. 13, the illumination device 50 and the camera 51 may be placed downstream of the tablet filling device 22. A tablet quality determination device 83 serving as the content quality determination unit may also be provided to determine the quality of the tablets 5, based on the transmitted image data obtained by the camera 51. The tablet quality determination device 83 comprises a processor, and may be configured, for example, to extract regions corresponding to the tablets 5 from the transmitted image data and make an inspection for the presence or the absence of the tablets 5, any breaking or cracking of the tablets 5, and the suitability of the shape and the size of the tablets 5 for the product type, based on the size and the number of the extracted regions. In this modification, the side portion state detector 52 may detect the average thickness of the bottom portion 2a or the like based on a region of the bottom portion 2a that does not overlap with the tablet 5 and may detect the thickness of the side portion 2b and the transmittance of the electromagnetic radiation in the side portion 2b.

This modified configuration may not just detect the state with regard to the thickness of the side portion 2b but determine the quality of the tablets 5, based on the transmitted image data obtained by the camera 51. This modified configuration accordingly simplifies the PTP packaging machine 11 and thereby reduces an increase in manufacturing and other costs of the PTP packaging machine 11.

Figure 14:
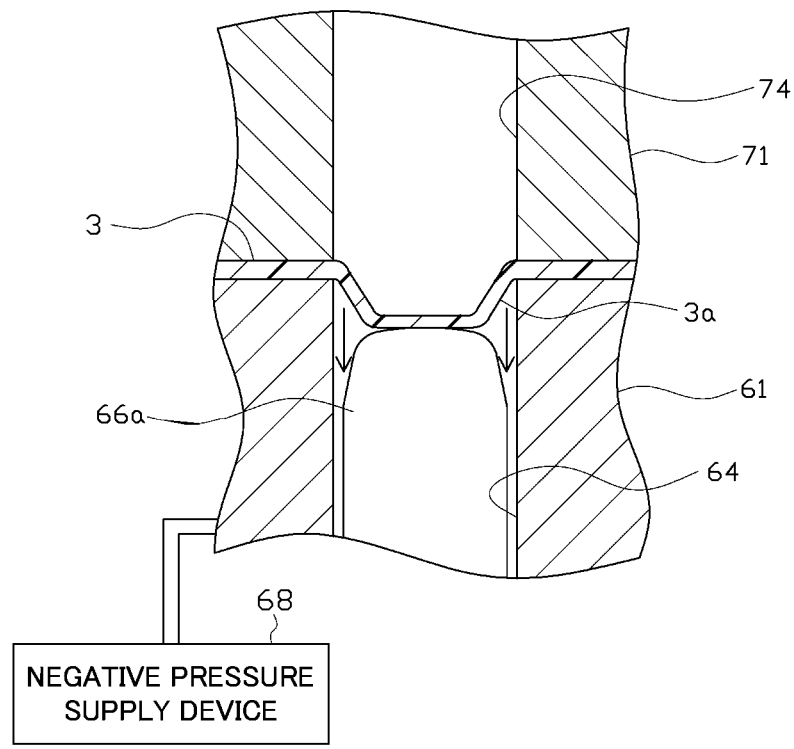
FIG. 14 is a schematic sectional diagram illustrating the configuration of expanding the predetermined forming regions by suction according to one or more embodiments.

(f) According to one or more embodiments described above, the predetermined forming regions 3a are expanded by supplying the gas into the gas supply holes 74. According to a modification, however, as shown in FIG. 14, a negative pressure supply device 68 serving as the expanding unit comprised of, for example, a vacuum pump may be provided to supply a negative pressure to the insertion holes 64 and suck the predetermined forming regions 3a so as to expand the predetermined forming regions 3a. In this modification, supplying the negative pressure to the insertion holes 64 corresponds to the film expanding process. In the configuration of expanding the predetermined forming regions 3a by suction, the predetermined forming regions 3a have substantially the same thicknesses as a whole, as in the configuration of expanding the predetermined forming regions 3a by supplying the gas. Another modification may expand the predetermined forming regions 3a by simultaneously performing the supply of the gas to the gas supply holes 74 and the supply of the negative pressure to the insertion holes 64.

Figure 15:
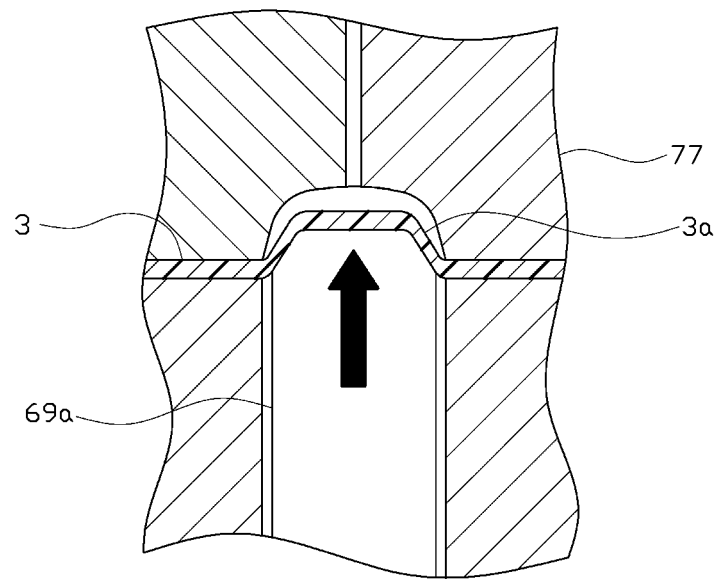
FIG. 15 is a schematic sectional diagram illustrating the process of forming the pocket portions according to one or more embodiments.
Figure 16:
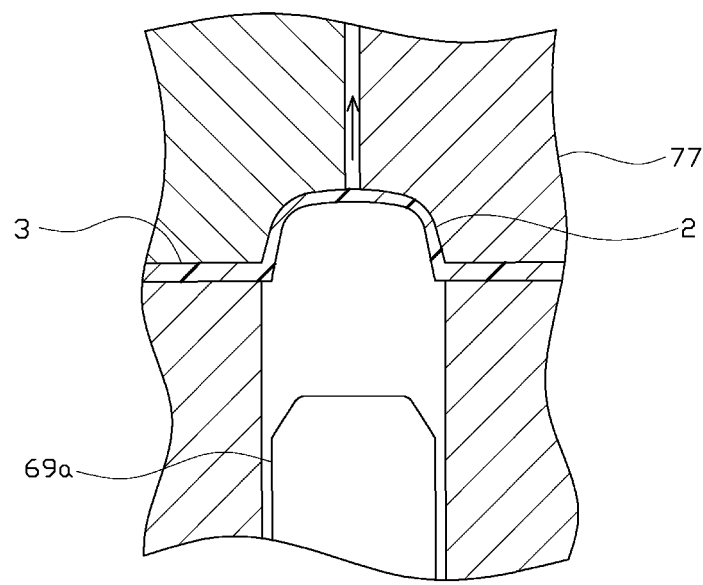
FIG. 16 is a schematic sectional diagram illustrating the process of forming the pocket portions according to one or more embodiments.

(g) The embodiments described above are configured to eventually form the pocket portions 2 by reversing the expanding direction of the predetermined forming regions 3a. A modification may, however, be configured to form the pocket portions 2 without reversing the expanding direction of the predetermined forming regions 3a. For example, as shown in FIG. 15 and FIG. 16, the modified configuration may form the pocket portions 2 by using preliminary stretch plugs 69 to press and stretch the predetermined forming regions 3a and then causing the predetermined forming regions 3a to be expanded in a direction opposite to the preliminary stretch plugs 69 and come into close contact with a mold 77 having a shape corresponding to the pocket portions 2 by supply of a negative pressure (by vacuum drawing).

In this modified configuration, setting a relatively large pressing amount by the preliminary stretch plug 69 provides a relatively thick area of the predetermined forming region 3a corresponding to the bottom portion 2a and a relatively thin area of the predetermined forming region 3a corresponding to the side portion 2b. Setting a relatively small pressing amount by the preliminary stretch plug 69, on the other hand, provides a relatively thin area of the predetermined forming region 3a corresponding to the bottom portion 2a and a relatively thick area of the predetermined forming region 3a corresponding to the side portion 2b. In any case, the area corresponding to the bottom portion 2a is made thicker than the area corresponding to the side portion 2b. When the predetermined forming region 3a is expanded by supply of the negative pressure, the area corresponding to the bottom portion 2a and the area corresponding to the side portion 2b are stretched almost evenly. Accordingly, the balance between the thickness of the bottom portion 2a and the thickness of the side portion 2a in the pocket portions 2 may be adjusted by changing the pressing amount by the preliminary stretch plugs 69. The predetermined forming regions 3a may be expanded by the supply of the gas (i.e., the pressure).

In the expanding process S3, the pocket portions 2 may be formed by causing the predetermined forming regions 3a to be expanded in a direction opposite to that of the above embodiments (i.e., in a direction opposite to the plugs 66a) by the supply of the gas or the supply of the negative pressure (i.e., the pressure or vacuum drawing) and subsequently pressing inside of the expanded predetermined forming regions 3a by means of the plugs 66a. In this modification, receiving elements may be provided on the opposite side to the plugs 66a across the container film 3 to support the expanded predetermined forming regions 3a. The position of the receiving elements may be regulated to regulate the stretch amount of the predetermined forming regions 3a and accordingly to adjust the wall thickness of the predetermined forming regions 3a and thereby the wall thickness of the pocket portions 2. The receiving elements may be retracted to a position that does not interfere with the move of the plugs 66a in the process of pressing the predetermined forming regions 3a by means of the plugs 66a.

The technique of adjusting the balance between the thickness of the bottom portion 2a and the thickness of the side portion 2b is not limited to the techniques described above, but any other techniques may be employed for the balance adjustment.

(h) The embodiments described above are configured to regulate the intermediate stop position of the plugs 66a, based on the difference (thickness difference) between the average thickness of the bottom portion 2a and the thickness reference value. In other words, the above embodiments are configured to regulate the intermediate stop position of the plugs 66a unless the average thickness is equal to the thickness reference value. A modification may, however, be configured to regulate the intermediate stop position of the plugs 66a, for example, only when the average thickness of the bottom portion 2a is larger than a predetermined upper limit value or is smaller than a predetermined lower limit value. In other words, the modification may be configured not to change the intermediate stop position of the plugs 66a when the average thickness of the bottom portion 2a is equal to or larger than the above lower limit value and is equal to or smaller than the above upper limit value. This modified configuration reduces the processing load involved in regulation of the intermediate stop position and accordingly reduces the manufacturing and other costs of the PTP packaging machine 11.

The above upper limit value and the above lower limit value may be reference values for determining the quality of the pocket portions 2 with regard to the gas barrier property or may be values set with adding some margins to these reference values (i.e., values having smaller absolute values than these reference values). In the latter case, the balance between the thickness of the bottom portion 2a and the thickness of the side portion 2b may be corrected before the gas barrier property of the pocket portion 2 becomes actually insufficient. This configuration more reliably prevents the defective PTP sheet 1 having poor gas barrier property from being manufactured, thus reducing the costs relating to production and enhancing the productivity.

(i) The above embodiments describe the PTP sheet 1 as the blister sheet. The technical scope of the present invention may, however, be applied to any blister sheet other than the PTP sheet 1. The above embodiments describe the tablet 5 as the content. The content is, however, specifically limited but may be a capsule or an electronic component. Furthermore, the materials of forming the container film 3 and the cover film 4 may be changed.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1 . . . PTP sheet (blister sheet), 2 . . . pocket portion, 2a . . . bottom portion, 2b . . . side portion, 3 . . . container film, 3a . . . predetermined forming region, 4 . . . cover film, 5 . . . tablet (content), 11 . . . PTP packaging machine (blister packaging machine), 16 . . . pocket portion forming device (pocket portion forming unit), 22 . . . tablet filling device (filling unit), 50 . . . illumination device (illumination unit), 51 . . . camera (imaging unit), 52 . . . side portion state detector (side portion state detecting unit), 61 . . . lower mold (second mold), 64 . . . insertion hole (second hole), 66a . . . plug (pressing element), 68 . . . negative pressure supply device (expanding unit), 71 . . . upper mold (first mold), 74 . . . gas supply hole (first hole), 76 . . . gas supply device (expanding unit), 81 . . . control device (controller), 82 . . . filling control device (filling controller), 83 . . . tablet quality determination device (content quality determination unit)

The invention claimed is:

1. A blister packaging machine comprising:
a pocket portion forming unit that forms a pocket portion having a bottom portion and a side portion, in a container film, and adjusts balance between a thickness of the bottom portion and a thickness of the side portion;
an illumination device that is disposed on a downstream side of the pocket portion forming unit, and irradiates the pocket portion with an electromagnetic radiation;
an imaging device that is disposed on a side opposite to the illumination device across the container film, and obtains transmitted image data based on the electromagnetic radiation transmitted through the pocket portion;
a side portion state detector that detects a state of the thickness of the side portion based on the transmitted image data;
a controller that prevents the thickness of the side portion from being thinner than a predetermined value by controlling the pocket portion forming unit based on a result of detection by the side portion state detector;
a filling device that fills a content into the pocket portion; and
a filling controller that prohibits the filling device from filling the content into the pocket portion upon determining that the thickness of the side portion is thinner than the predetermined value.

2. The blister packaging machine according to claim 1, wherein
the side portion state detector detects the state of the thickness of the side portion based on a state of the thickness of the bottom portion in the transmitted image data.

3. The blister packaging machine according to claim 2, wherein
the container film is formed from a transparent resin material, and
the illumination device emits ultraviolet light as the electromagnetic radiation.

4. The blister packaging machine according to claim 3, wherein
the pocket portion forming unit comprises:
a first mold having a first hole;
a second mold having a second hole that is disposed opposite to the first hole across the container film;
a plug that is movable back and forth with respect to the second hole; and
an expanding unit that expands the container film by at least one of supplying a gas to the first hole and supplying a negative pressure to the second hole, and
the pocket portion forming unit further:
sandwiches the container film between the first and second molds,
places the plug at an intermediate stop position set in advance to be away from the container film,
expands a predetermined forming region of the pocket portion in the container film toward the plug, and
presses the expanded forming region toward the first hole by the plug to form the pocket portion.

5. The blister packaging machine according to claim 4, wherein
the filling device is disposed on the downstream side of the pocket portion forming unit,
the illumination device irradiates the pocket portion and the content with the electromagnetic radiation on a downstream side of the filling device, and
the blister packaging machine further comprises:
a content quality determination device that determines a quality of the content based on the obtained transmitted image data.

6. The blister packaging machine according to claim 3, wherein
the filling device is disposed on the downstream side of the pocket portion forming unit,
the illumination device irradiates the pocket portion and the content with the electromagnetic radiation on a downstream side of the filling device, and
the blister packaging machine further comprises:
a content quality determination device that determines a quality of the content based on the obtained transmitted image data.

7. The blister packaging machine according to claim 2, wherein
the pocket portion forming unit comprises:
a first mold having a first hole;
a second mold having a second hole that is disposed opposite to the first hole across the container film;
a plug that is movable back and forth with respect to the second hole; and
an expanding unit that expands the container film by at least one of supplying a gas to the first hole and supplying a negative pressure to the second hole, and
the pocket portion forming unit further:
sandwiches the container film between the first and second molds,
places the plug at an intermediate stop position set in advance to be away from the container film,
expands a predetermined forming region of the pocket portion in the container film toward the plug, and
presses the expanded forming region toward the first hole by the plug to form the pocket portion.

8. The blister packaging machine according to claim 7, wherein
the filling device is disposed on the downstream side of the pocket portion forming unit,
the illumination device irradiates the pocket portion and the content with the electromagnetic radiation on a downstream side of the filling device, and
the blister packaging machine further comprises:
a content quality determination device that determines a quality of the content based on the obtained transmitted image data.

9. The blister packaging machine according to claim 2, wherein
the filling device is disposed on the downstream side of the pocket portion forming unit,
the illumination device irradiates the pocket portion and the content with the electromagnetic radiation on a downstream side of the filling device, and
the blister packaging machine further comprises:
a content quality determination device that determines a quality of the content based on the obtained transmitted image data.

10. The blister packaging machine according to claim 1, wherein
the container film is formed from a transparent resin material, and
the illumination device emits ultraviolet light as the electromagnetic radiation.

11. The blister packaging machine according to claim 10, wherein
the pocket portion forming unit comprises:
a first mold having a first hole;
a second mold having a second hole that is disposed opposite to the first hole across the container film;
a plug that is movable back and forth with respect to the second hole; and
an expanding unit that expands the container film by at least one of supplying a gas to the first hole and supplying a negative pressure to the second hole, and
the pocket portion forming unit further:
sandwiches the container film between the first and second molds,
places the plug at an intermediate stop position set in advance to be away from the container film,
expands a predetermined forming region of the pocket portion in the container film toward the plug, and
presses the expanded forming region toward the first hole by the plug to form the pocket portion.

12. The blister packaging machine according to claim 11, wherein
the filling device is disposed on the downstream side of the pocket portion forming unit,
the illumination device irradiates the pocket portion and the content with the electromagnetic radiation on a downstream side of the filling device, and
the blister packaging machine further comprises:
a content quality determination device that determines a quality of the content based on the obtained transmitted image data.

13. The blister packaging machine according to claim 10, wherein
the filling device is disposed on the downstream side of the pocket portion forming unit,
the illumination device irradiates the pocket portion and the content with the electromagnetic radiation on a downstream side of the filling device, and
the blister packaging machine further comprises:
a content quality determination device that determines a quality of the content based on the obtained transmitted image data.

14. The blister packaging machine according to claim 1, wherein
the pocket portion forming unit comprises:
a first mold having a first hole;
a second mold having a second hole that is disposed opposite to the first hole across the container film;
a plug that is movable back and forth with respect to the second hole; and
an expanding unit that expands the container film by at least one of supplying a gas to the first hole and supplying a negative pressure to the second hole, and
the pocket portion forming unit further:
sandwiches the container film between the first and second molds,
places the plug at an intermediate stop position set in advance to be away from the container film,
expands a predetermined forming region of the pocket portion in the container film toward the plug, and
presses the expanded forming region toward the first hole by the plug to form the pocket portion.

15. The blister packaging machine according to claim 14, wherein
the filling device is disposed on the downstream side of the pocket portion forming unit,
the illumination device irradiates the pocket portion and the content with the electromagnetic radiation on a downstream side of the filling device, and
the blister packaging machine further comprises:
a content quality determination device that determines a quality of the content based on the obtained transmitted image data.

16. The blister packaging machine according to claim 1, wherein
the filling device is disposed on a downstream side of the illumination device.

17. The blister packaging machine according to claim 1, wherein
the filling device is disposed on the downstream side of the pocket portion forming unit,
the illumination device irradiates the pocket portion and the content with the electromagnetic radiation on a downstream side of the filling device, and
the blister packaging machine further comprises:
a content quality determination device that determines a quality of the content based on the obtained transmitted image data.

* * * * *